US009255487B2

(12) United States Patent
Mayer et al.

(10) Patent No.: US 9,255,487 B2
(45) Date of Patent: Feb. 9, 2016

(54) GAS TURBINE ENGINE SEAL CARRIER

(75) Inventors: Robert Russell Mayer, Manchester, CT (US); Paul W. Palmer, South Glastonbury, CT (US); Jonathan Lemoine, South Hadley, MA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 730 days.

(21) Appl. No.: 13/362,712

(22) Filed: Jan. 31, 2012

(65) Prior Publication Data

US 2013/0192260 A1 Aug. 1, 2013

(51) Int. Cl.
*F02C 7/00* (2006.01)
*F01D 11/00* (2006.01)
*F01D 25/28* (2006.01)
*F01D 25/16* (2006.01)

(52) U.S. Cl.
CPC ............ *F01D 11/003* (2013.01); *F01D 25/162* (2013.01); *F01D 25/28* (2013.01); *F05D 2240/58* (2013.01)

(58) Field of Classification Search
CPC ..... F01D 25/162; F01D 25/28; F01D 25/243; F02K 3/06; F05D 2240/11; F05D 2240/55
USPC ............ 60/805, 796, 797, 798, 799; 415/142, 415/229, 213.1, 209.4, 210.1
See application file for complete search history.

(56) References Cited

U.S. PATENT DOCUMENTS 3,053,590 A * 9/1962 Dison .......................... 384/480
3,747,343 A * 7/1973 Rosen .......................... 60/226.1
4,384,822 A 5/1983 Schweikl et al.
4,457,667 A * 7/1984 Seibert et al. ................. 415/229
5,311,734 A 5/1994 Pope et al.
5,597,167 A 1/1997 Snyder et al.
5,597,286 A 1/1997 Dawson et al.
5,622,438 A 4/1997 Walsh et al.
6,932,567 B2 8/2005 Albers et al.
7,238,008 B2 7/2007 Bobo et al.
7,694,505 B2 4/2010 Schilling
7,762,087 B2 7/2010 Somanath et al.
7,802,962 B2 9/2010 Sjoqvist
7,819,622 B2 10/2010 Paulino et al.
8,061,969 B2 11/2011 Durocher et al.
8,066,473 B1 11/2011 Aho, Jr.
8,074,440 B2 12/2011 Kohlenberg et al.
8,091,371 B2 1/2012 Durocher et al.
8,099,962 B2 1/2012 Durocher et al.
2008/0302907 A1* 12/2008 Schafer .......................... 244/54
2008/0310956 A1* 12/2008 Jain .............................. 415/200
2010/0135770 A1* 6/2010 Durocher et al. ............... 415/69
2010/0162683 A1* 7/2010 Grabowski et al. .......... 60/226.3
2010/0257841 A1* 10/2010 Pero et al. .................... 60/226.2

OTHER PUBLICATIONS

Gunston, Bill, "Jane's Aero-Engines," Issue Seven, 2000, pp. 510-512.
International Search Report and Written Opinion for International Application No. PCT/US2013/020748 completed on Aug. 26, 2013.
International Preliminary Report on Patentability International Application No. PCT/US2013/020748. Date of issuance Aug. 5, 2014.

* cited by examiner

*Primary Examiner* — Steven Sutherland
(74) *Attorney, Agent, or Firm* — Carlson, Gaskey & Olds, P.C.

(57) ABSTRACT

A gas turbine engine includes a seal assembly that is supported by a member at a joint. The seal assembly includes a seal support having a radial flange secured to the joint. A first bend adjoins the radial flange to a first leg, which is oriented generally in an axial direction. A second bend adjoins the first leg to a second leg, which is conical in shape. A seal is supported by the second leg.

16 Claims, 2 Drawing Sheets

GAS TURBINE ENGINE SEAL CARRIER

BACKGROUND

This disclosure relates to a gas turbine engine mid turbine frame bearing support.

One typical gas turbine engine includes multiple, nested coaxial spools. A low pressure turbine is mounted on a first spool, and a high pressure turbine is mounted on a second spool. A mid turbine frame, which is part of the engine's static structure, is arranged axially between the low and high pressure turbines. The turbine frame includes an inner hub and outer shroud with a circumferential array of airfoils adjoining the hub and shroud, providing a gas flow path.

One typical static structure design includes a hot airfoil structure that is cooled by air channeled in a cooling cavity. The hot airfoil creates one side of this cavity, while the cold frame, or support, provides the other. The cold frame is also coupled to the bearing compartment, which must be kept cool to prevent the oil from overheating. The cooling cavity is sealed. Any leakage from the cooling cavity is heated by convection against the hot airfoil, causing the leakage to drive a thermal gradient across the seal carrier and cold frame.

SUMMARY

A gas turbine engine includes a seal assembly that is supported by a member at a joint. The seal assembly includes a seal support having a radial flange secured to the joint. A first bend adjoins the radial flange to a first leg, which is oriented generally in an axial direction. A second bend adjoins the first leg to a second leg, which is conical in shape. A seal is supported by the second leg.

In a further embodiment of any of the above, the second leg provides a channel that carries the seal.

In a further embodiment of any of the above, the seal is a piston ring.

In a further embodiment of any of the above, a mid turbine case has a seal land. The seal engages the seal land.

In a further embodiment of any of the above, the member is arranged radially inward of the mid turbine frame.

In a further embodiment of any of the above, the seal assembly is integral with the inner case.

In a further embodiment of any of the above, the seal support doubles back to provide a fold. The fold is provided by the first and second legs and the second bend.

In a further embodiment of any of the above, the member is arranged radially inward of the mid turbine frame, and a cooling cavity is provided between the member and the mid turbine frame. The seal configured to seal the cooling cavity at one side.

In a further embodiment of any of the above, the gas turbine engine includes a fan and a compressor section fluidly connected to the fan. The compressor includes a high pressure compressor and a low pressure compressor. A combustor is fluidly connected to the compressor section, and a turbine section is fluidly connected to the combustor. The turbine section includes the high pressure turbine, and the low pressure turbine is coupled to the low pressure compressor via a shaft. A geared architecture is interconnects the shaft and the fan. A seal assembly is provided in at least one of the compressor and turbine sections. The seal assembly is supported by a mid turbine frame at a joint. The mid turbine frame is arranged between the high and low pressure turbines. The seal assembly includes a seal support having a radial flange secured to the joint. A first bend adjoins the radial flange to a first leg, which is oriented generally in an axial direction. A second bend adjoins the first leg to a second leg, which is conical in shape.

In a further embodiment of any of the above, the gas turbine engine is a high bypass geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

In a further embodiment of any of the above, the geared architecture includes a gear reduction ratio of greater than about 2.5:1.

In a further embodiment of any of the above, the fan includes a low corrected fan tip speed of less than about 1150 ft/s.

In another embodiment, the gas turbine engine includes a fan and a compressor section fluidly connected to the fan. The compressor includes a high pressure compressor and a low pressure compressor. A combustor is fluidly connected to the compressor section, and a turbine section is fluidly connected to the combustor. The turbine section includes the high pressure turbine, and the low pressure turbine is coupled to the low pressure compressor via a shaft. A geared architecture is interconnects the shaft and the fan. The seal assembly is provided in at least one of the compressor and turbine sections.

In a further embodiment of any of the above, the gas turbine engine is a high bypass geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

In a further embodiment of any of the above, the geared architecture includes a gear reduction ratio of greater than about 2.5:1.

In a further embodiment of any of the above, the fan includes a low corrected fan tip speed of less than about 1150 ft/s.

BRIEF DESCRIPTION OF THE DRAWINGS

The disclosure can be further understood by reference to the following detailed description when considered in connection with the accompanying drawings wherein.

DETAILED DESCRIPTION

Figure 1:
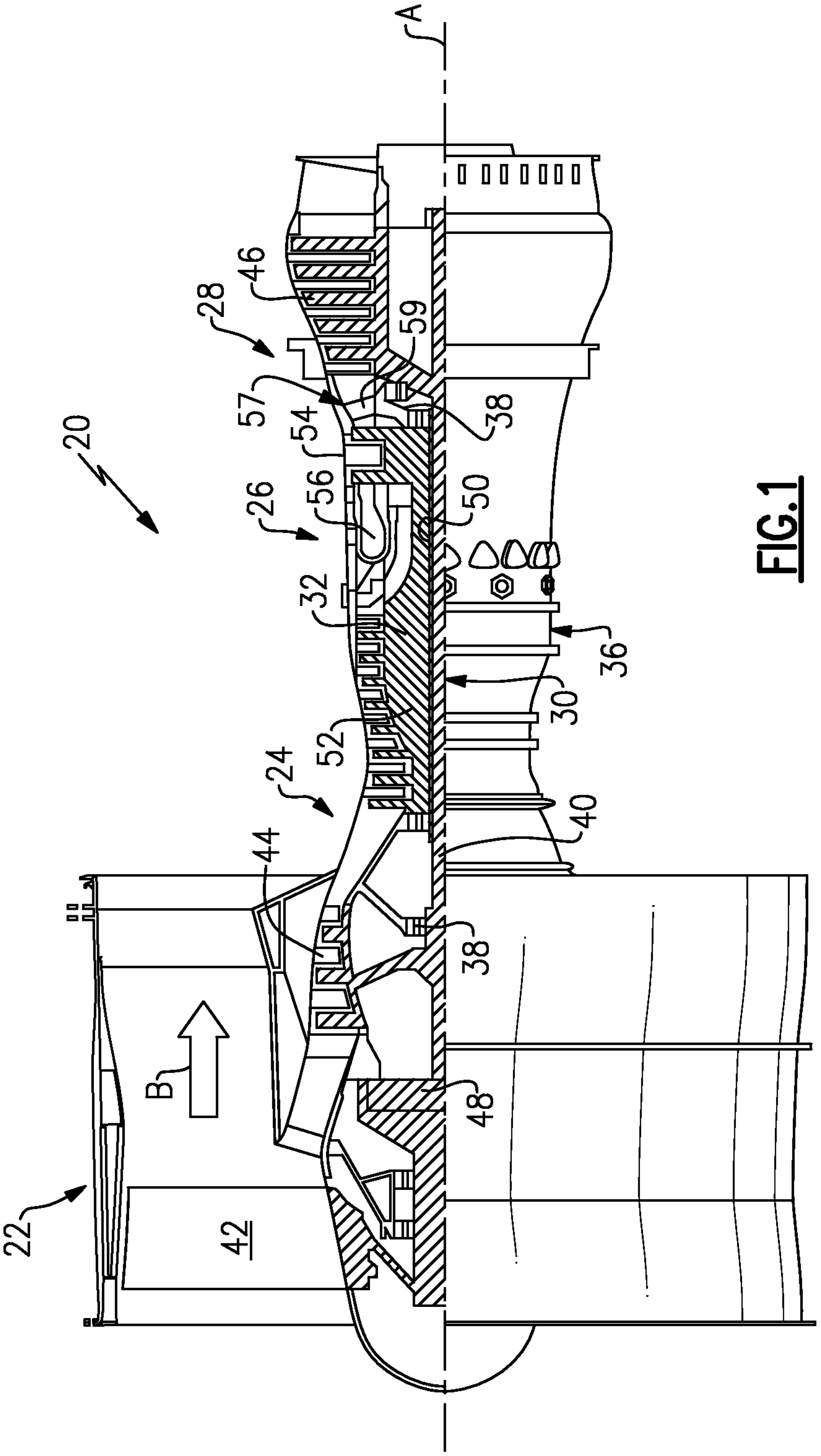
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than a ratio of approximately 10:1, the geared architecture 48 is an epicyclic gear train, such as a planetary gear system or other gear system, with a gear reduction ratio of greater than about 2.3:1 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC.

"Low corrected fan tip speed" is the actual fan tip speed in ft/sec divided by an industry standard temperature correction of $[(\text{Tambient deg R})/518.7)^{0.5}]$. The "Low corrected fan tip speed" as disclosed herein according to one non-limiting embodiment is less than about 1150 ft/second.

Figure 2:
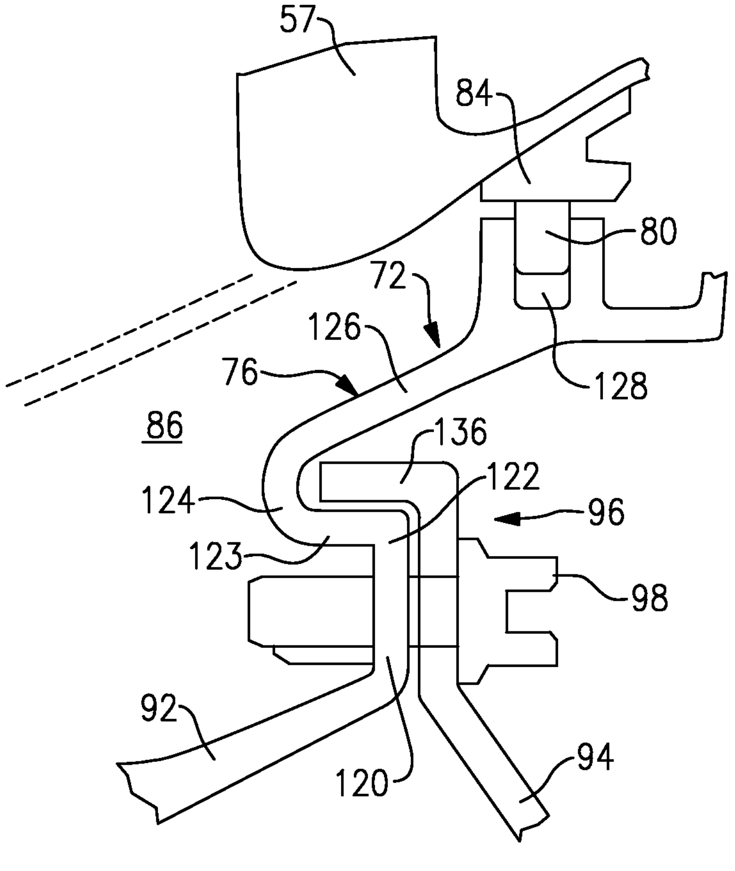
FIG. 2 is a cross-sectional view of a portion of an engine static structure in the area of a mid turbine frame.

Referring to FIG. 2, the mid turbine frame 57 includes a first member 92. The mid turbine frame 57 is a "hot" component that is isolated from the bearing system 38, a "cold" component. To this end, a cooling cavity 86 is provided between the first member 92 and the mid turbine frame 57. A cooling source, such as low compressor turbine air, is in fluid communication with the cooling cavity 86, for example.

A sealing assembly 72 is supported by the first member 92 to seal the cooling cavity 86 relative to the mid turbine frame 57. It should be understood that the sealing assembly 72 may be used in other parts of the engine 20. The sealing assembly 70 includes a seal support 76 that carries a piston ring 80, which mates with a seal land 84 mounted on the mid turbine frame 57. The piston ring 80 is permitted to float in the radial direction relative to the seal support, ensuring sealing engagement with the seal land throughout various thermal gradients. Other types of seals may be used, such as finger seals, brush seals, and labyrinth-type seals.

In the example, the first member 92 is secured to a second member 94 at a joint 96 with fasteners 98. The second seal support 76 is shown as an integral member with the first member 92, but it should be understood that the seal support 76 may be a separate, discrete component from the first member 92. The seal support 76 includes a radial flange 120 secured at the joint 96. A first bend 122 adjoins the radial flange 120 to a first leg 123, which is oriented generally in the axial direction in the example shown. The second member 94 includes an annular flange 136 that axially overlaps first leg 123 and extends adjacent to the second bend 124. A second bend 124 adjoins the first leg 123 to a second leg 126, which provides a channel 128 that carries the second piston ring 80.

The second seal support 76 doubles back to provide a fold, which permits the second seal support 76 to thermally expand while reducing thermal stress on the second seal support 76. Instead of typical radial-only loads on the second seal support 76, the fold permits the second seal support 76 to move axially as well.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:

a seal assembly supported by a member at a joint, the seal assembly including a seal support having a radial flange secured to the joint, a first bend adjoins the radial flange and a first leg, which extends from the radial flange generally in a first axial direction, a second bend adjoins the first leg to a second leg, which is conical in shape, wherein the first and second legs are tangential to opposing ends of the second bend, the second leg extends from the second bend generally in a second axial direction that is opposite of the first axial direction to provide a fold, the first and second legs and first and second bends provided by an integral member, the second leg provides a channel at a portion not adjoining the second bend and the first leg; and a seal carried by the channel.

2. The gas turbine engine according to claim 1, wherein the seal is a piston ring.

3. The gas turbine engine according to claim 1, comprising a mid turbine case having a seal land, the seal engaging the seal land.

4. The gas turbine engine according to claim 3, wherein the member is arranged radially inward of the mid turbine frame.

5. The gas turbine engine according to claim 4, wherein the member is a first member, and comprising a second member secured to the first member at the joint, the second member includes an annular flange extending axially, the annular flange radially outward of the radial flange, the fold wrapping about the annular flange.

6. The gas turbine engine according to claim 3, wherein the seal assembly is integral with the member.

7. The gas turbine engine according to claim 1, wherein the member is arranged radially inward of a mid turbine frame, and a cooling cavity is provided between the member and the mid turbine frame, and the seal configured to seal the cooling cavity at one side.

8. The gas turbine engine according to claim 1, comprising:

a fan;

a compressor section fluidly connected to the fan, the compressor comprising a high pressure compressor and a low pressure compressor;

a combustor fluidly connected to the compressor section;

a turbine section fluidly connected to the combustor, the turbine section comprising:

a high pressure turbine;

a low pressure turbine coupled to the low pressure compressor via a shaft;

a geared architecture interconnects between the shaft and the fan; and wherein the seal assembly is provided in at least one of the compressor and turbine sections.

9. The gas turbine engine according to claim 8, wherein the gas turbine engine includes a low Fan Pressure Ratio of less than 1.45.

10. The gas turbine engine according to claim 8, wherein the fan includes a low corrected fan tip speed of less than 1150 ft/s.

11. The gas turbine engine according to claim 1, wherein the portion is remote from the second bend and the first leg.

12. A gas turbine engine, comprising:

a fan;

a compressor section fluidly connected to the fan, the compressor comprising a high pressure compressor and a low pressure compressor;

a combustor fluidly connected to the compressor section;

a turbine section fluidly connected to the combustor, the turbine section comprising:

a high pressure turbine;

a low pressure turbine coupled to the low pressure compressor via a shaft;

a geared architecture interconnects between the shaft and the fan;

a seal assembly provided in at least one of the compressor and turbine sections, the seal assembly supported by a mid turbine frame at a joint, the mid turbine frame arranged between the high and low pressure turbines, the seal assembly including a seal support having a radial flange secured to the joint, a first bend adjoins the radial flange to a first leg, which extends from the radial flange generally in a first axial direction, a second bend adjoins the first leg to a second leg, which is conical in shape, wherein the first and second legs are tangential to opposing ends of the second bend, the second leg extends from the second bend generally in a second axial direction that is opposite of the first axial direction to provide a fold, the first and second legs and first and second bends provided by an integral member, the second leg provides a channel at a portion not adjoining the second bend and the first leg; and a seal carried by the channel.

13. The gas turbine engine according to claim 12, wherein the gas turbine engine includes a low Fan Pressure Ratio of less than 1.45.

14. The gas turbine engine according to claim 12, wherein the fan includes a low corrected fan tip speed of less than 1150 ft/s.

15. The gas turbine engine according to claim 12, wherein the mid turbine frame is a first member, and comprising a second member secured to the first member at the joint, the second member includes an annular flange extending axially, the annular flange radially outward of the radial flange, the fold wrapping about the annular flange.

16. The gas turbine engine according to claim 12, wherein the portion is remote from the second bend and the first leg.

* * * * *